(12) United States Patent
McGrath et al.

(10) Patent No.: US 6,272,349 B1
(45) Date of Patent: Aug. 7, 2001

(54) INTEGRATED GLOBAL POSITIONING SYSTEM RECEIVER

(75) Inventors: Finbarr McGrath, Westford; William Griffin, North Chelmsford; John LaChapelle, Princeton; David Martin, Methuen, all of MA (US); David Frederick Jordan, Danville, NH (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/255,590

(22) Filed: Feb. 22, 1999

Related U.S. Application Data

(60) Provisional application No. 60/075,549, filed on Feb. 23, 1998.

(51) Int. Cl.[7] .................................................. H04Q 7/20
(52) U.S. Cl. ............................. 455/456; 455/40; 455/345
(58) Field of Search ........................... 455/456, 90, 457, 455/12.1, 427, 345, 347; 342/357.1, 357.06, 357.07, 357.08, 357.09, 42; 343/711; 361/748, 750, 752, 814

(56) References Cited

U.S. PATENT DOCUMENTS

| | | | |
|---|---|---|---|
| 5,223,844 | * 6/1993 | Mansell et al. | 455/456 |
| 5,357,254 | * 10/1994 | Kah, Jr. | 342/42 |
| 5,504,684 | * 4/1996 | Lau et al. | 342/357.06 |
| 5,819,163 | * 10/1998 | Tsukamoto et al. | 455/90 |
| 5,889,493 | * 3/1999 | Endo | 342/357.08 |
| 6,078,294 | * 6/2000 | Mitarai | 343/711 |
| 6,121,922 | * 9/2000 | Mohan | 342/357.1 |

* cited by examiner

Primary Examiner—Nay Maung
Assistant Examiner—Quochien B. Vuong

(57) ABSTRACT

A GPS receiver (1) has an antenna (3) mounted directly on a first side (4) of a multilayer printed circuit board (PCB) substrate 2. Electrical conductors interconnect the antenna (3) with an RF processing system (11,12) and a digital processing system (10, 14, 15, 16) mounted directly on a second side (5) of the PCB substrate (2). A position connector (17) is disposed on one side of the PCB substrate (2) and provides power, ground, and direct electrical access of processed GPS signals for an external system such as a mobile vehicle system.

20 Claims, 1 Drawing Sheet

INTEGRATED GLOBAL POSITIONING SYSTEM RECEIVER

RELATED APPLICATION

The present application claims the benefit of priority based on U.S. Provisional Application No. 60/075,549 filed on Feb. 23, 1998.

FIELD OF THE INVENTION

The present invention relates to antennas, and more particularly to antennas having higher levels of integration than previously known.

BACKGROUND OF THE INVENTION

An antenna appropriate for receiving radio frequency (RF) signals transmitted by global positioning system (GPS) satellites is known. It is desirable to incorporate the positioning capabilities of the GPS into an automobile. The known antenna, for example M/A-COM part ANPC 128B-N-7-2, receive a 1.51 Ghz radio frequency signal and launches the received signal onto a cable to a coaxial connector termination. A printed circuit board (PCB) in the automobile receives the RF signal to process it further down to an intermediate frequency (IF). The IF is then launched to another PCB populated with digital circuitry having GPS intelligence for interpretation of the signal into positioning information. Disadvantageously, the transmission of the RF signal through the cable injects introduces noise and generates loss, which can degrade the signal RF prior to processing. Degradation of the RF signal has a direct impact in reducing the sensitivity and the effectiveness of the overall system. The known GPS solution also requires relatively large packaging and is expensive to design and maintain at the system level due to the number of functional modules that comprises the overall system. The problem is exacerbated in an automobile because the standard form factor of a passenger automobile, the desirable physical size of the automobile, and the desirability of passenger space limit the available "on board" space for functional components. Once a system is installed in an automobile, because it is aesthetically desirable to hide the automobile's functional systems, access to the system's component parts is also limited. The problem is further exacerbated by the difficulty in installing coaxial cables and connectors in a vehicle. Coaxial cable is not a standard component for the automobile industry and degrades GPS performance but also causes coupling of unwanted signals to other electronic components such as the radio. Much of the wiring in vehicles is now implemented as a data bus.

There is a need, therefore, for a smaller, more efficient, and less expensive GPS system especially packaged to connect directly to standard vehicle wiring harnesses and data buses.

SUMMARY OF THE INVENTION

A GPS receiver comprises a printed circuit board substrate and an antenna disposed on the printed circuit board substrate. There is at least one integrated circuit disposed on the printed circuit board substrate with electrical conductors interconnecting the antenna and the at least one integrated circuits. An electrical connector is disposed on the printed circuit board substrate providing electrical access to the at least one integrated circuit, It is a feature of a GPS receiver according to the teachings of the present invention that a receiving antenna and digital data connector (implementing the bus, power and Ground interfaces) are integrated on a single PCB with all intervening analog and digital circuitry also mounted on the PCB.

It is a feature of an embodiment according to the teachings of the present invention that a GPS integrated receiver provides a direct connection of a GPS receiver to a data bus including all of the GPS signal intelligence and the electronics to transmit signals to and from the vehicle bus, It is an advantage of a GPS receiver according to the teachings of the present invention that the system sensitivity is improved over prior art GPS systems.

It is an advantage of a GPS receiver according to the teachings of the present invention that the system is smaller, less expensive to manufacture, and more reliable than prior art GPS systems.

It is an advantage of a GPS receiver according to the teachings of the present invention that the overall system complexity is less than prior art GPS systems.

It is an advantage of a GPS receive according to the teachings of the present invention that the units will be less susceptible to electromagnetic interference and will cause less interference in other electronic components.

It is an advantage of a GPS receiver according to the teachings of the present invention that ease of installation will be substantially improved by a direct or "one touch" installation procedure onto a vehicle bus.

It is an advantage of a GPS receiver according to the teachings of the present invention that overall installation of GPS onto a vehicle will be less obtrusive affecting the styling and vehicle design and allowing the GPS and antenna to be hidden. This means it is less likely to be forcefully removed if the vehicle is stolen.

It is an advantage of a GPS receiver according to the teachings of the present invention that a GPS receiver with the physical means to connect to a vehicle bus can provide additional networking features not yet contemplated by the current state of the art including output of GPS data directly to the vehicle standard wiring harness, reading data messages from the vehicle to perform diagnostic self checking, and output of data on demand.

BRIEF DESCRIPTION OF THE DRAWINGS

Embodiments of the invention will now be described by way of example and with reference to the drawings in which.

DETAILED DESCRIPTION OF THE PREFERRED EMBODIMENTS

Figure 1:
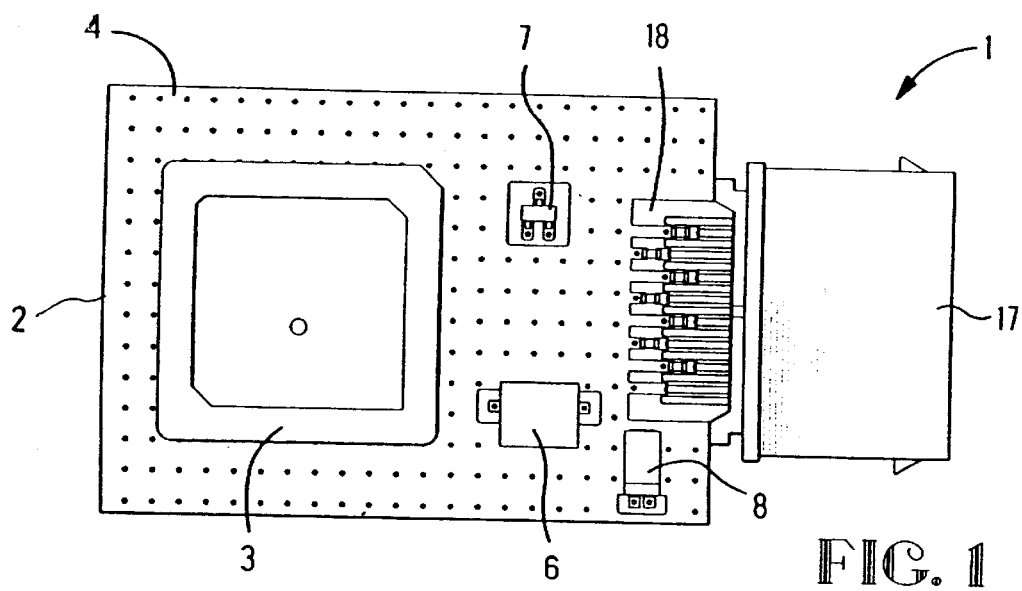
FIG. 1 is a plan view of a first side of a GPS receiver system according to the teachings of the present invention.

With specific reference to FIG. 1 of the drawings, there is shown an integrated GPS receiver system 1 according to the teachings of the present invention. What is shown and described herein specifically describes a GPS receiver system optimized for an on board automobile application. The teachings of the invention, however, are applicable to other applications having similar functional requirements such as embedded cell telephones and data terminals, proximity sensors, or any other wireless communications devices. The integrated receiver system 1 comprises a multilayer PCB substrate 2 having a patch antenna 3 mounted directly on a first side 4 of the PCB 2. The patch antenna 3 is optimized to receive a 1.51 Ghz RF signal from GPS satellites. A multilayer PCB refers to a PCB having a number of alternating layers of dielectric and conductive printed traces interconnected by conductive vias in a particular pattern that is appropriate for a given electrical circuit. Surface mountable two-pole filter 6, diode 7, and capacitor 8 are also surface mounted onto the first side 4 of the PCB. An output of the antenna (not shown) is interconnected to the filter 6, diode 7, and capacitor 8 through interconnecting vias and traces (not shown) on an intermediate layer of the PCB to complete the RF filter system. A filtered RF signal is output out of the RF filter system. All, but a portion of the first side 4 of the PCB surrounding the components mounted thereto is metalized to form a shielding ground plane to improve performance of the receiver system.

Figure 2:
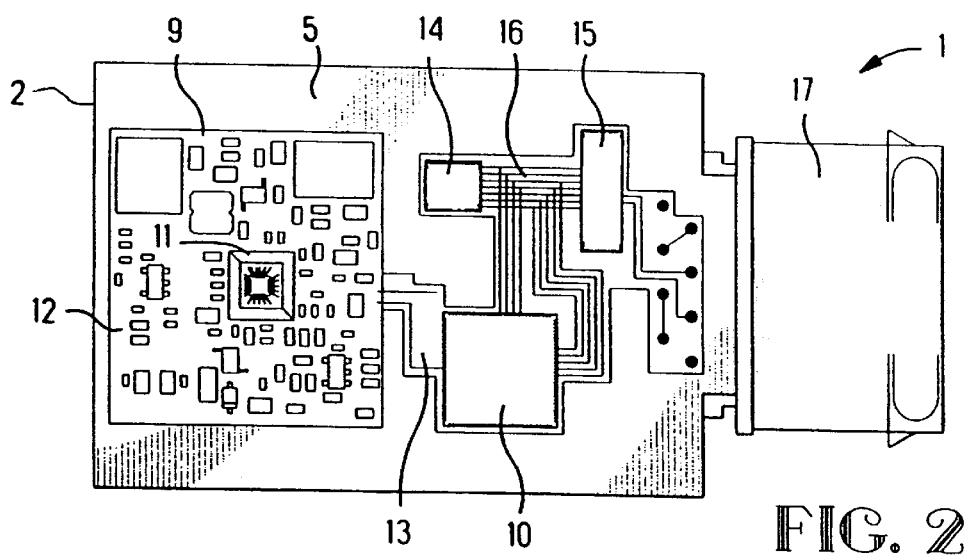
FIG. 2 is a plan view of a second side of a GPS receiver system according to the teachings of the present invention.

With specific reference to FIG. 2 of the drawings, there is shown a second side 5 of the PCB substrate 2 on which a RF processing system 9 and digital processing system 10 are disposed. The RF processing system 9 comprises a RF application specific integrated circuit (ASIC) die 11, which in the disclosed embodiment is a NAVSTAR ROC3 integrated circuit. The RF ASIC die 11 is mounted directly to the board using "chip on board" manufacturing technology. "Chip on board" manufacturing technology is known in the art and comprises mounting IC die directly to a PCB substrate, wirebonding IC contacts to conductive traces printed onto the PCB 2, and covering the IC and wirebonds with a protective polymer. "Chip on board" manufacturing technology advantageously obviates the need for separately packaging each IC which helps to reduce the physical size and cost of the resulting circuit. Circuitry 12 supporting the RF ASIC is also mounted to the second side 5 of the PCB 2 using either "chip on board" or surface mount technology as appropriate. Interconnecting traces and vias present in the PCB 2 interconnect the RF ASIC 11 with the supporting circuitry 12. Advantageously, the "chip on board" technology removes the use of packaging for the RF ASIC and significantly shortens the length of interconnecting traces through which the analog signals travel. The shortened length reduces the amount of resistive and reactive impedances and, therefore, also reduces signal degradation and loss present in prior art solutions. The RF ASIC 11 and supporting circuitry 12 perform functions that include frequency generation of the local oscillator (LO) and down-conversion of the RF signal to an intermediate frequency (IF). The RF processing system 9 outputs an IF signal indicative of the received RF signal. An IF OUT interconnecting trace 13 interconnects the processed RF signal to a digital processing system. The digital processing system comprises a digital ASIC 10, which in a preferred embodiment is a NAVSTAR XR7 digital ASIC specifically optimized to receive and process an IF signal from a received GPS RF signal and transmit this processed data to the bus or receive data from the bus, supporting digital circuitry comprising program memory 14 and data memory 15. The digital ASIC 10 is interconnected to the program and data memories 14,15 (e.g. for sorting map data) through a plurality of parallel interconnection traces 16. The digital ASIC 10 samples and digitizes the received IF signal, correlates the data, detects the satellite code, calculates position, velocity and time as a function of the received RF signal and formats the position velocity and time data to be read from the bus. The digital ASIC 10 also reads and interprets bus data and can perform diagnostic self-check of the entire GPS system. An output of the digital ASIC 10 comprises digital data representing position and velocity of the vehicle in which the patch antenna is disposed. Similar to the first side 4 of the 2 PCB 2, all but a portion of the second side 5 of the PCB surrounding the RF processing system 12 components and surrounding the digital processing system components and interconnecting traces are metalized to form a shielding ground plane to improve performance of the receiver system.

Figure 3:
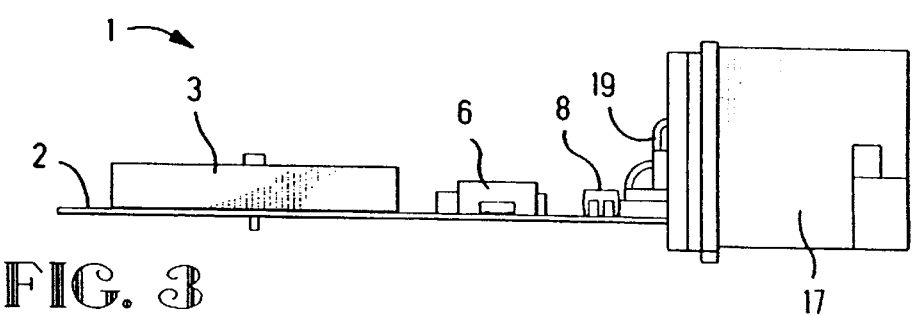
FIG. 3 is a side view of a GPS receiver system according to the teachings of the present invention.

The PCB 2 has an eight (8) position connector 17 mounted thereon. The connector 17 supplies power from an external source (e.g., vehicle power supply, and reference potential to the entire receiver system 1 and launches the processed GPS information external to the PCB 2. As showing in FIG. 3, each digital line is capacitively filtered with chip capacitors 18 positioned between each one of a plurality of signal terminals 19 and the reference potential. The digital data from the initial ASIC 10 is communicated to a main processor area (not shown), typically a large PCB, mounted in an automobile that centralizes all of the intelligence functions for the automobile. The GPS information is one of many pieces of information received and processed by the automobile's main on board computer. The connector 17, as shown in the drawings, is chosen for matability with an existing cable assembly in the automobile. Alternatively, a smaller eight (8) position connector is equally suitable provided the automobile's cable assembly is equipped to interface with the connector chosen. Advantageously, any degradation of the digital signal over the cable in the cable assembly can be recovered through signal processing without compromise in the sensitivity of the overall GPS receiver system.

As will occur to one of ordinary skill in the art, the present invention may be optimized for a GPS receiver mounted in other vehicles or in a hand held unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A global positioning system (GPS) receiver comprising:

a printed circuit board substrate;

a GPS antenna disposed on the printed circuit board substrate, at least one integrated circuit disposed on the printed circuit board substrate for processing signals from the GPS antenna;

electrical conductors for interconnecting the GPS antenna and the at least one integrated circuit; and an electrical connector disposed on the printed circuit board substrate for establishing a data communication path between the at least one integrated circuit and an electronic system of a vehicle, whereby the GPS receiver is capable of being integrated into the electronic system of the vehicle.

2. A GPS receiver as recited in claim 1 wherein said at least one integrated circuit processes high frequency signals.

3. A GPS receiver as recited in claim 1 wherein the at least one integrated circuit transmits and receives data to and from a data bus in the electronic system of the vehicle through the electrical connector.

4. A GPS receiver as recited in claim 3 wherein the electrical connector is a plug-in connector which can be plugged into the electronic system of the vehicle.

5. A GPS receiver as recited in claim 4, further comprising, a ROM (Read Only Memory) disposed on the printed circuit board substrate for storing map data to be used with signals processed by the at least one integrated circuit.

6. A GPS receiver as recited in claim 3, further comprising:
  a memory disposed on the printed circuit board substrate for storing map data to be used with signals processed by the at least one integrated circuit.

7. A GPS receiver as recited in claim 6 wherein power to the GPS receiver is supplied from the electronic system of the vehicle.

8. A GPS receiver as recited in claim 6 wherein the at least one integrated circuit and the memory are disposed on one side of the printed circuit board substrate, and the GPS antenna is disposed on another side of the printed circuit board substrate.

9. A GPS receiver as recited in claim 2 wherein said at least one integrated circuit includes a fist integrated circuit for converting radio frequency signals from the GPS antenna into intermediate frequency signals, and a second integrated circuit for performing operations on the intermediate frequency signals to produce GPS signals, and transmitting the GPS signals to the electronic system of the vehicle.

10. A GPS receiver as recited in claim 1 wherein the second integrated circuit comprises circuitry for initiating a diagnostic check up operation on the GPS receiver responsive to the data from the data bus of the electronic system of the vehicle.

11. A method for providing a GPS (global positioning system) receiver, the method comprising the steps of:
  providing a printed circuit board substrate;
  providing a GPS antenna on the printed circuit board substrate;
  providing at least one integrated circuit on the printed circuit board substrate for processing signals from the GPS antenna;
  providing electrical conductors on the printed circuit board substrate for interconnecting the GPS antenna and the at least one integrated circuit; and
  providing an electrical connector on the printed circuit board substrate for establishing a data communication path between the at least one integrated circuit and an electronic system of a vehicle,
  whereby the GPS receiver is capable of being integrated into the electronic system of the vehicle.

12. A method as recited in claim 11, wherein the at least one integrated circuit processes high frequency signals.

13. A method as recited in claim 11, wherein the at least one integrated circuit transmits and receives data to and from a data bus in the electronic system of the vehicle through the electrical connector.

14. A method as recited in claim 13 wherein the electrical connector is a plug-in connector which can be plugged into the electronic system of the vehicle.

15. A method as recited in claim 14, further comprising:
  providing a ROM (Read Only Memory) on the printed circuit board substrate for storing map data to be used with signals processed by the at least one integrated circuit.

16. A method as recited in claim 13, further comprising:
  providing a memory on the printed circuit board substrate for storing map data to be used with signals processed by the at least one integrated circuit.

17. A method as recited in claim 16, further comprising:
  supplying power to the GPS receiver from the electronic system of the vehicle.

18. A method as recited in claim 16, wherein the at least one integrated circuit and the memory are formed on one side of the printed circuit board substrate, and the GPS antenna is formed on another side of the printed circuit board substrate.

19. A method as recited in claim 13, wherein the at least one integrated circuit includes a first integrated circuit for converting radio frequency signals from the GPS antenna into intermediate frequency signals, and a second integrated circuit for performing operations on the intermediate frequency signals to produce GPS signals and transmitting the GPS signals to the electronic system of the vehicle.

20. A method as recited in claim 19, further comprising:
  receiving, through the electrical connector, data from the data bus in the electronic system of the vehicle; and
  initiating a diagnostic check up operation on the GPS receiver responsive to said data.

* * * * *